United States Patent
Ishige

(10) Patent No.: US 8,335,156 B2
(45) Date of Patent: Dec. 18, 2012

(54) NETWORK CONNECTION CONTROL SYSTEM

(75) Inventor: Taro Ishige, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 361 days.

(21) Appl. No.: 12/707,608

(22) Filed: Feb. 17, 2010

(65) Prior Publication Data

US 2010/0208646 A1    Aug. 19, 2010

(30) Foreign Application Priority Data

Feb. 17, 2009  (JP) ................................ 2009-033455

(51) Int. Cl.
*H04J 1/16* (2006.01)
*H04L 12/56* (2006.01)

(52) U.S. Cl. ......... 370/230; 370/252; 370/315; 370/329

(58) Field of Classification Search .................. 370/252, 370/230, 315, 329
See application file for complete search history.

(56) References Cited

U.S. PATENT DOCUMENTS

| 2004/0133779 A1 | 7/2004 | Sato et al. | |
| 2005/0108518 A1* | 5/2005 | Pandya | 713/151 |
| 2010/0226250 A1* | 9/2010 | Plamondon | 370/230 |

FOREIGN PATENT DOCUMENTS

| JP | 2003-069594 A | 3/2003 |
| JP | 2004-304392 A | 10/2004 |
| JP | 2005-311658 A | 11/2005 |
| JP | 2006-050224 A | 2/2006 |
| WO | WO 2005/104459 A1 | 11/2005 |

* cited by examiner

*Primary Examiner* — John Pezzlo
(74) *Attorney, Agent, or Firm* — Kilpatrick Townsend & Stockton LLP

(57) ABSTRACT

A network connection control system is provided with: a relay device that relays communication in a communication network; and a communication terminal that performs communication via the relay device. The relay device has a network information transmission section, which is information about the communication network. The communication terminal has: a lower communication section that performs communication via the relay device; a network information receiving section that receives the network information via the lower communication section; a higher communication section that performs inter-higher-section communication via the lower communication section, with another higher communication section in another communication terminal; a judgment result acquisition section that acquires a judgment result based on the received network information, about whether or not to permit the inter-higher-section communication; and a communication control section that inhibits the inter-higher-section communication until a judgment result that the inter-higher-section communication is to be permitted is acquired.

7 Claims, 12 Drawing Sheets

---

NETWORK CONNECTION APPROVAL SCREEN

■ ACCESS POINT INFORMATION
  - ACCESS POINT NAME: XXX CONNECTION
    OPERATOR: YYYY COMPANY;
    CERTIFICATE AUTHORITY: ZZZZ CERTIFICATE AUTHORITY
  - ENCRYPTION METHOD: WEP 128 BITS
  - THE NUMBER OF VIRUSES FOUND IN NETWORK: 0/MONTH
  - THE NUMBER OF SIMULTANEOUS CONNECTIONS TO NETWORK 0/2
  - CLIENT AUTHENTICATION METHOD: NONE
  - NETWORK TYPE: CLOSED

■ CONNECTING-USER INFORMATION
  - CONNECTING USER (2)
    · XXX COMPANY, MR. YYY
    · XXX COMPANY, MR. ZZZ

■ PROVIDED SERVICES
  - SERVICE A (USED BY 1/USABLE BY 3); WAITING TIME: 0 MINUTE
  - SERVICE B (USED BY 3/USABLE BY 3); WAITING TIME: 10 MINUTES

[APPROVE]   [DO NOT APPROVE]

FIG. 4

NETWORK CONNECTION APPROVAL SCREEN

■ ACCESS POINT INFORMATION
  - ACCESS POINT NAME: XXX CONNECTION
    OPERATOR: YYYY COMPANY;
    CERTIFICATE AUTHORITY: ZZZZ CERTIFICATE AUTHORITY
  - ENCRYPTION METHOD: WEP 128 BITS
  - THE NUMBER OF VIRUSES FOUND IN NETWORK: 0/MONTH
  - THE NUMBER OF SIMULTANEOUS CONNECTIONS TO NETWORK 0/2
  - CLIENT AUTHENTICATION METHOD: NONE
  - NETWORK TYPE: CLOSED

■ CONNECTING-USER INFORMATION
  - CONNECTING USER (2)
    · XXX COMPANY, MR. YYY
    · XXX COMPANY, MR. ZZZ

■ PROVIDED SERVICES
  - SERVICE A (USED BY 1/USABLE BY 3); WAITING TIME: 0 MINUTE
  - SERVICE B (USED BY 3/USABLE BY 3); WAITING TIME: 10 MINUTES

| APPROVE | DO NOT APPROVE |

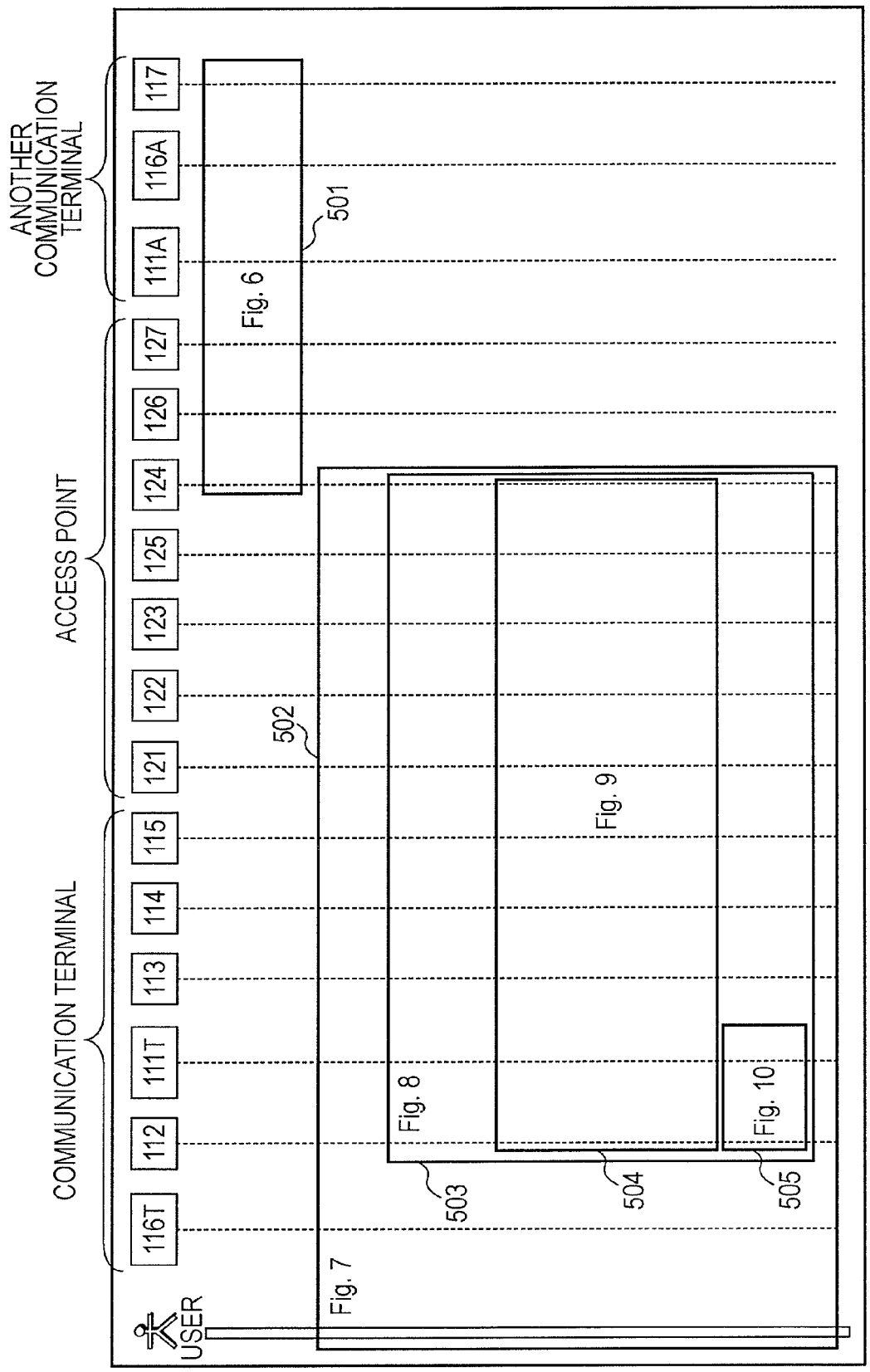

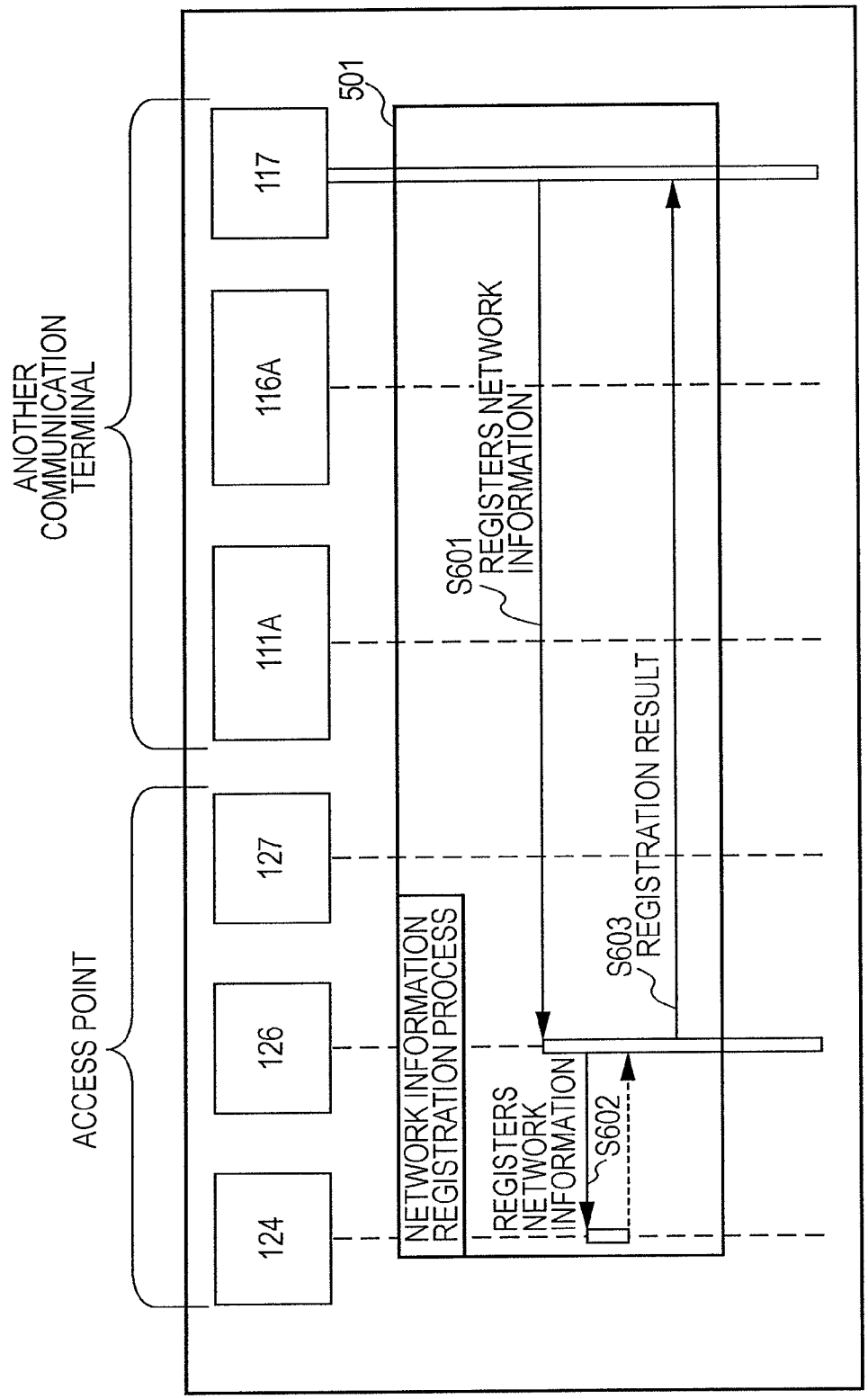

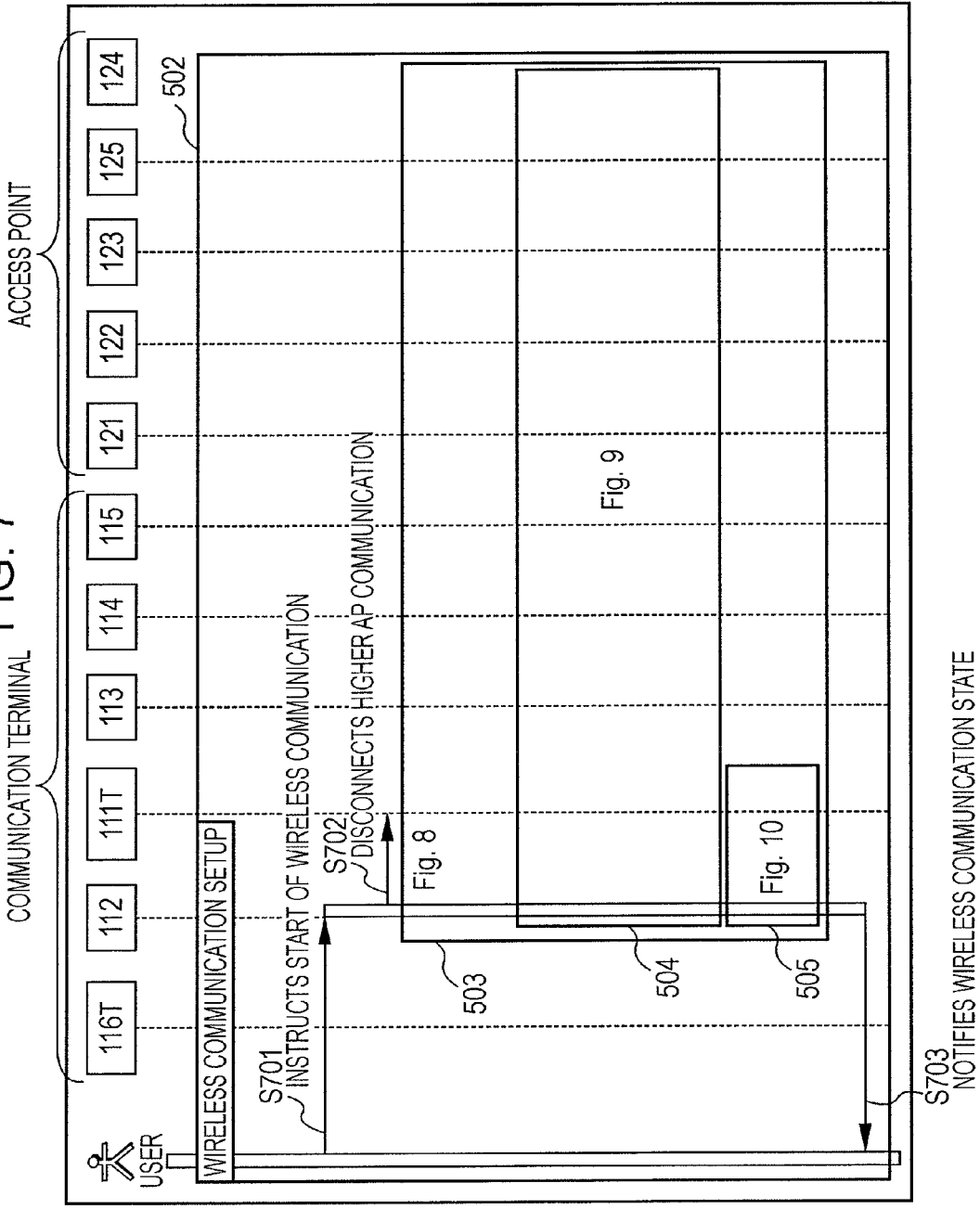

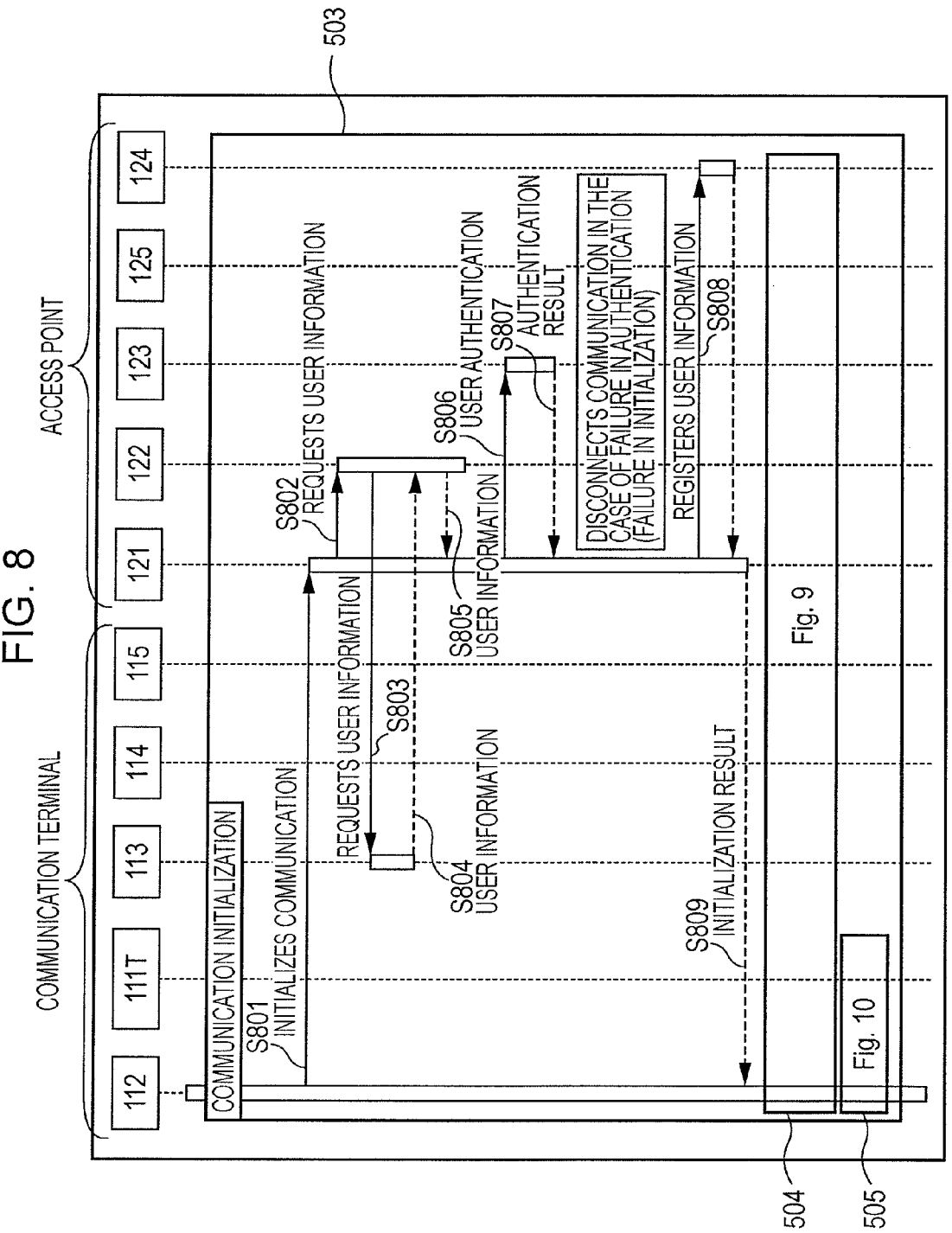

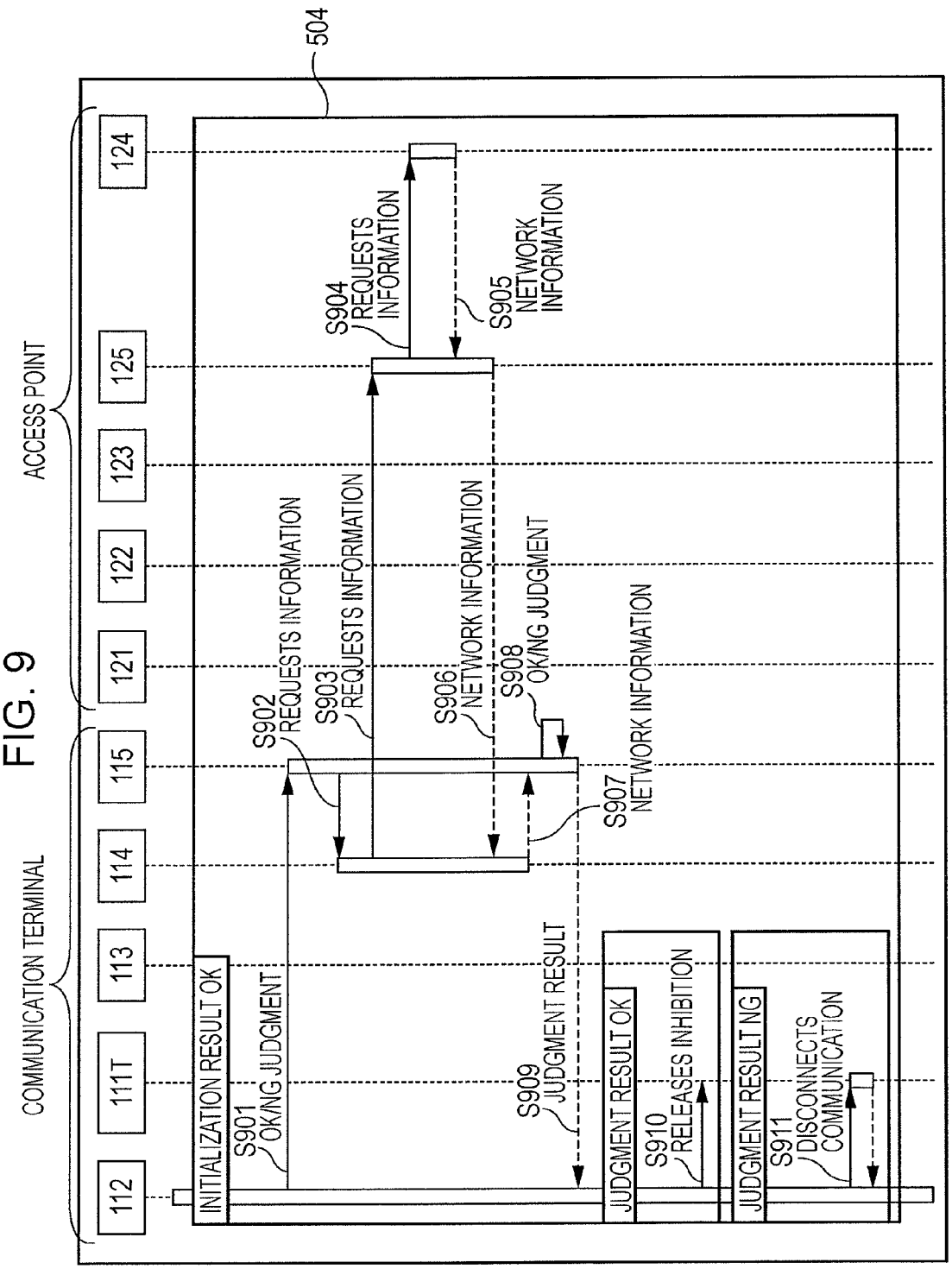

NETWORK CONNECTION CONTROL SYSTEM

BACKGROUND

1. Technical Field

The present invention relates to connection to a communication network.

2. Related Art

A wireless LAN (Local Area Network) is known as one of communication networks. Recently, the number of places where an access point is installed has been increasing. Accordingly, it becomes possible to connect to a wireless LAN and perform communication at various places.

As a technique related to connection to a wireless LAN, there is, for example, a technique disclosed in JP-A-2004-304392. According to JP-A-2004-304392, a wireless LAN bridge transmits a frame in which Internet setting information is embedded, and a terminal device connects to the Internet using the Internet setting information in the frame.

Using the technique described in JP-A-2004-304392, it is possible to easily connect to the Internet via a wireless LAN bridge.

However, for example, to an access point installed at a public place, such as a station and an airport, communication terminals of unspecified users are generally connected. Furthermore, it may be possible that a large number of unspecified users connect to the access point at the same time. For these reasons, there is a concern about risks such as wiretapping and unauthorized access.

Furthermore, it may happen that, after a user has connected to an access point, the user finds it worthless to connect to the access point for reasons such as a service desired by the user not being provided on a wireless LAN. Accordingly, the above-mentioned risks unnecessarily increase.

The above problem is not limited to wireless LANs. In the case of connecting to a relay device in a wired network also, the problem may occur.

SUMMARY

An advantage of some aspects of the invention is to reduce risks brought by the connection to a relay device that relays communication in a communication network.

After a communication terminal connects to a relay device using connection information, a higher communication section (for example, a communication application) in the communication terminal is able to perform inter-higher-section communication (for example, inter-application communication) with another higher communication section in another communication terminal via a lower communication section.

According to an aspect of the invention, a relay device is provided with a network information transmission section, and a communication terminal is provided with a network information receiving section, a judgment result acquisition section and a communication control section. After the communication terminal connects to the relay device, the communication control section in the communication terminal inhibits the inter-higher-section communication. The network information transmission section in the relay device transmits network information, which is information about a communication network, to the communication terminal, and the network information receiving section in the communication terminal receives the network information. The judgment result acquisition section acquires a judgment result based on the received network information, about whether or not to permit the inter-higher-section communication. The communication control section keeps inhibition of the inter-higher-section communication until a judgment result that the inter-higher-section communication is permitted is acquired. Each of these sections may be realized by a hardware circuit or may be realized by a microprocessor executing a computer program. The computer program can be downloaded from a site on a communication network or from a storage medium (for example, a CD-ROM).

The above-mentioned network information includes, for example, at least one of information about the safety of a communication network which includes the above-mentioned relay device and information about the value for a user connecting to the relay device. As the former information, there is, for example, at least one of information about the relay device itself and information about the users using other communication terminals connected to the relay device. As the latter information, there is information about services provided by the other communication terminals connected to the relay device.

BRIEF DESCRIPTION OF THE DRAWINGS

The invention will be described with reference to the accompanying drawings, wherein like numbers reference like elements.

FIG. 4 shows a network connection approval screen according to an embodiment of the invention.

FIG. 5 shows an entire configuration of processes performed in an embodiment of the invention.

FIG. 6 shows a flow of network information registration process according to an embodiment of the invention.

FIG. 7 shows a flow of wireless communication setup process according to an embodiment of the invention.

FIG. 8 shows a flow of communication initialization process according to an embodiment of the invention.

FIG. 9 shows a flow of initialization result OK process according to an embodiment of the invention.

DESCRIPTION OF EXEMPLARY EMBODIMENTS

An embodiment of the invention will be described below, with a case where a communication network is a wireless LAN and a relay device is an access point as an example.

Figure 1:
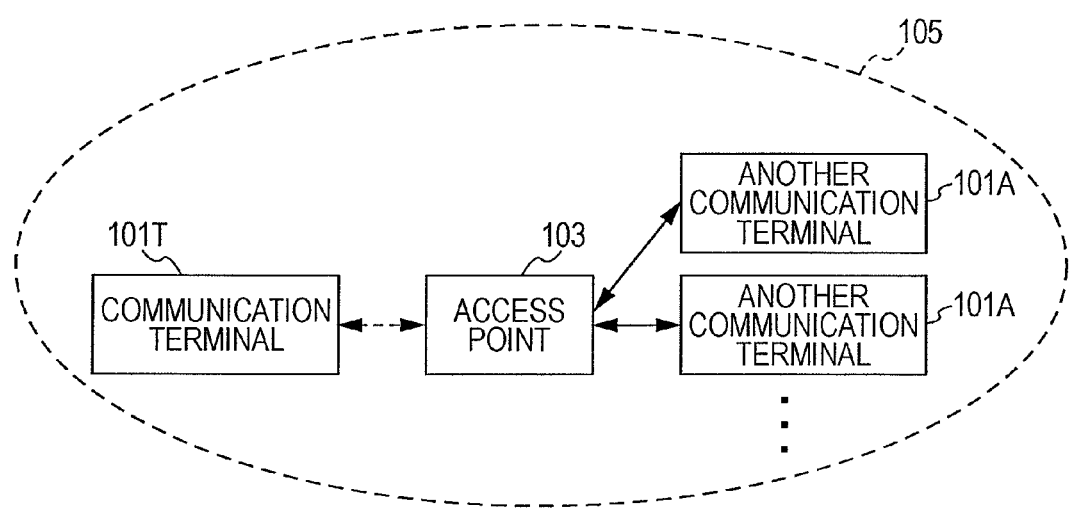
FIG. 1 shows a communication system according to an embodiment of the invention.

FIG. 1 shows a communication system according to an embodiment of the invention. In the description below, a child symbol "T" is used in addition to a parent symbol (for example, 101) for a communication terminal used by a user and elements in the terminal (for example, 101T). On the other hand, a child symbol "A" is used in addition to a parent symbol (for example, 101) for communication terminals used by other users (hereinafter referred to as other communication terminals) and elements in the terminals (for example, 101A).

A communication terminal 101T is able to connect to an access point 103 and communicate with other communication terminals 101A connected to the access point 103, via the access point 103.

Figure 2A:
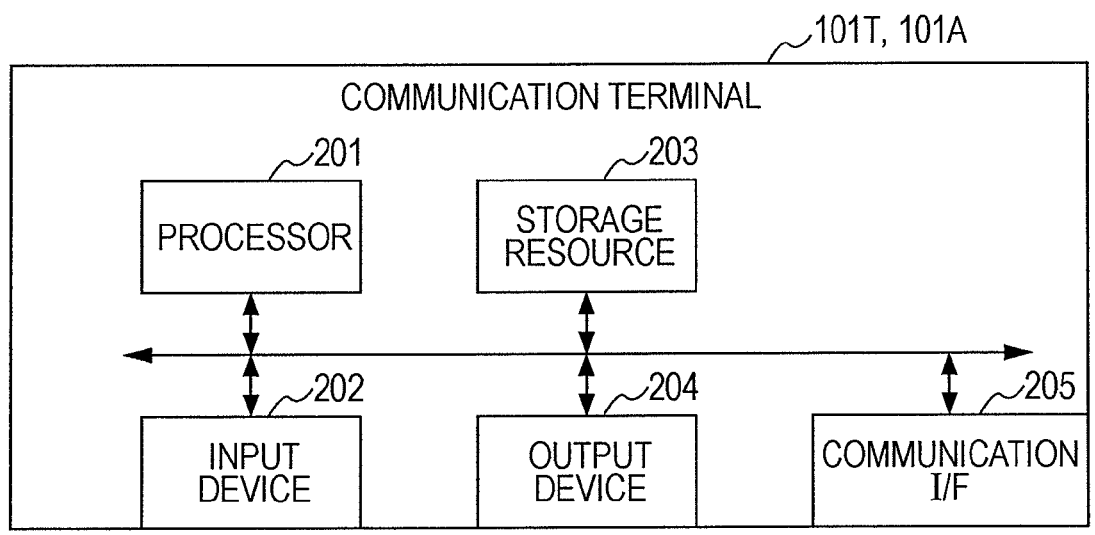
FIG. 2A shows a hardware configuration of a communication terminal according to an embodiment of the invention.

For example, as shown in FIG. 2A, each of the communication terminals 101T and 101A is provided with a processor 201, a storage resource 203, an input device 202, an output device 204, and a communication interface device (hereinafter referred to as a communication I/F) 205 for a wireless LAN. The processor 201 is typically a microprocessor such as a CPU (Central Processing Unit). The storage resource 203 may be configured, for example, by at least one storage device among a volatile memory, a non-volatile memory and a hard disk. The input device 202 is, for example, at least one of an operating panel (for example, a touch panel), keyboard buttons, a pointing device and the like. The output device 204 is, for example, at least one of an operating panel liquid crystal, a display and the like.

Figure 2B:
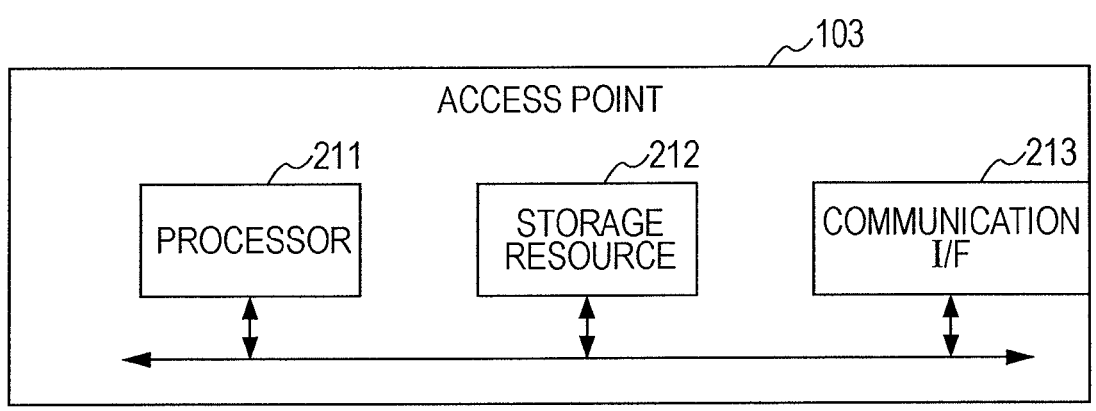
FIG. 2B shows a hardware configuration of an access point according to an embodiment of the invention.

For example, as shown in FIG. 2B, the access point 103 is provided with a processor 211, a storage resource 212, and a communication I/F 213 for a wireless LAN. The processor 211 is, for example, a CPU, and the storage resource 212 is, for example, a volatile memory and/or a non-volatile memory.

Figure 3:
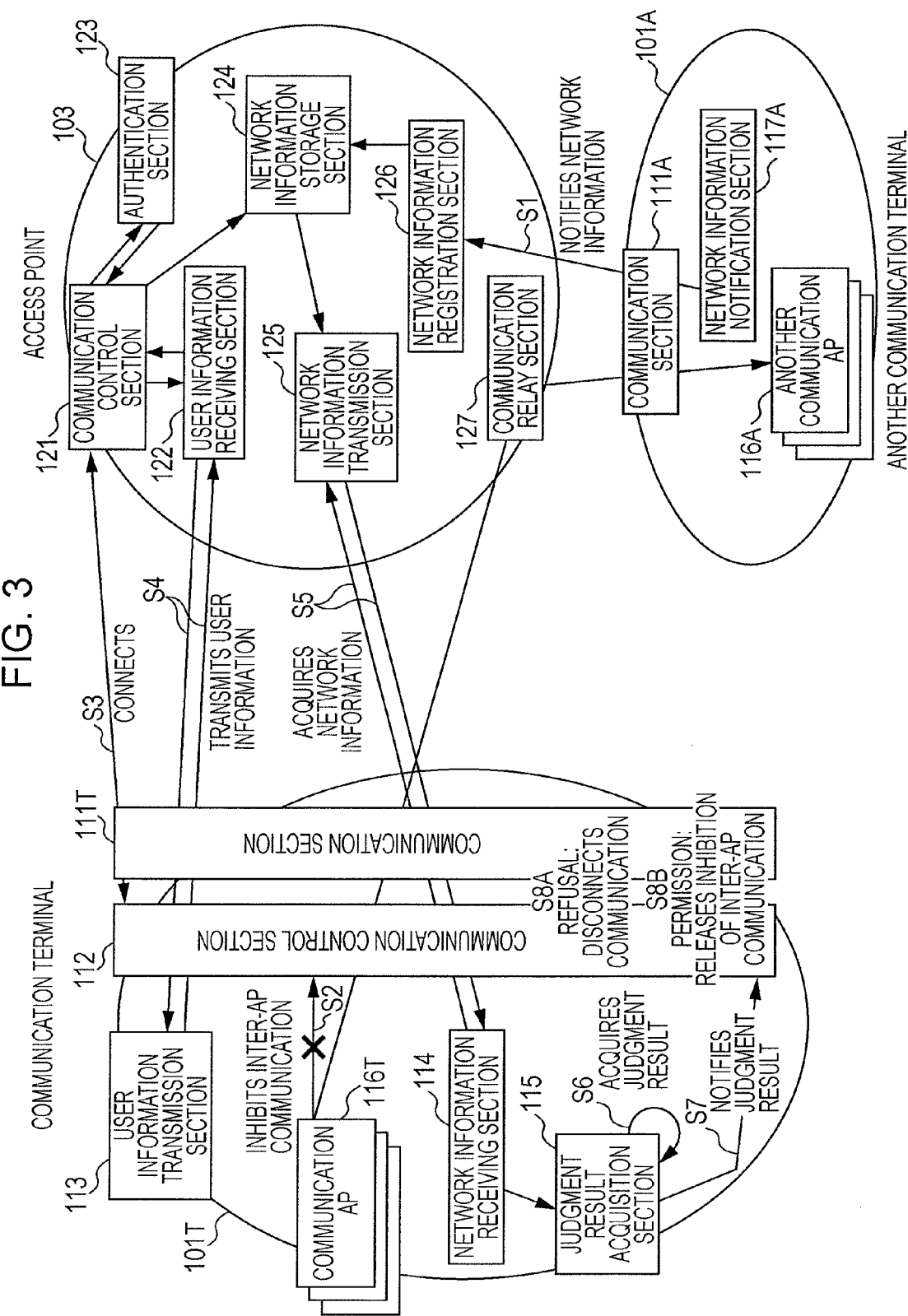
FIG. 3 shows functional blocks of each of the communication terminal, the access point and another communication terminal according to an embodiment of the invention, and as well shows information exchange between the access point and the communication terminal and between the access point and that other communication terminal.

FIG. 3 shows functional blocks of each of the communication terminal 101T, the access point 103 and one of the other communication terminals 101A, and as well shows information exchange between the access point 103 and the communication terminal 101T and between the access point 103 and that other communication terminal 101A.

The communication terminals 101T and 101A have communication applications (hereinafter referred to as communication APs) 116T and 116A, respectively. The communication APs 116T and 116A are, for example, software for communicating at a layer higher than a communication control section 112 to be described later. The communication APs 116T are, for example, a Web browser, e-mail software and the like. The communication APs 116A are software for providing various services such as provision of information, e-mail software and the like. Communication is performed between the communication APs 116T and the communication APs 116A (hereinafter referred to as other communication APs 116A). Hereinafter, this communication will be referred to as "inter-AP communication". The inter-AP communication is, for example, communication between an application layer of the communication terminal 101T and an application layer of that other communication terminal 101A.

The communication terminal 101T is provided with a communication section 111T, a communication control section 112, a user information transmission section 113, a network information receiving section 114 and a judgment result acquisition section 115 (that other communication terminal 101A is also provided with these elements, though it is not shown in FIG. 3). These elements 111T, 112, 113, 114 and 115 are functions which are realized, for example, by a computer program being read into the processor 201 from the storage resource 203 (see FIG. 2A) and are executed. Instead, all or a part of processes performed by the elements 111T, 112, 113, 114 and 115 may be realized by hardware.

The communication section 111T is, for example, a communication driver for communicating via the communication I/F 205 (see FIG. 2A). The communication control section 112 controls communication performed via the communication section 111T or connects to the access point 103 using connection information about the access point 103 (for example, an SSID (Service Set Identifier) and WEP (Wired Equivalent Privacy)). In this embodiment, the communication section 111T exists at a layer lower than (or the same layer as) the communication control section 112; the communication APs 116T exist at a layer higher than (or the same layer as) the communication control section 112; and the communication section 111T exists at a layer lower than the communication APs 116T.

The user information transmission section 113 provides user information to the access point 103. The user information is, for example, an electronic certificate of a user stored in the storage resource 203 in advance, a username inputted by the user or the like.

The network information receiving section 114 receives network information from the access point 103.

The judgment result acquisition section 115 acquires a judgment result about whether or not to permit inter-AP communication, which is based on the received network information. The judgment may be performed by the user or by the judgment result acquisition section 115.

The above-mentioned other communication terminal 101A is provided with a network information notification section 117. The network information notification section 117 notifies a particular kind of information held by that other communication terminal 101A (stored in the storage resource 203) to the access point 103 via a communication section 111A as network information. The information notified as network information is, for example, information about services provided by that other communication terminal (for example, a server) 101A (hereinafter referred to as provided service information). The provided service information includes, for example, the following information (P1) to (P4) for each service, that is, (P1) a service name, (P2) a URL (Uniform Resource Locator) indicating a place where a definition file about the Web service exists, (P3) information about the number of simultaneous users, and (P4) information indicating service waiting time. The information (P3) includes, for example, the number of users who are using the relevant service at the same time (the number of simultaneous users) and the maximum number of users who may use the service at the same time. The information (P4) is, for example, information to be indicated when a user has to wait until the service is given because the number of users who are using the service at the same time has reached the maximum number, or the like.

The access point 103 is provided with a communication control section 121, a user information receiving section 122, an authentication section 123, a network information storage section 124, a network information transmission section 125, a network information registration section 126 and a communication relay section 127. Those other than the network information storage section 124, among these elements, are functions which are realized, for example, by a computer program being read into the processor 211 from the storage resource 212 (see FIG. 2B) and are executed. The network information storage section 124 is the storage resource 212.

The communication control section 121 receives connection information from the communication terminal 101T (101A) and connects with the communication terminal 101T (101A) (establishes communication).

The user information receiving section 122 receives user information from the communication terminal 101T (101A).

The authentication section 123 judges whether the user information received by the user information receiving section 122 is correct or not. If the user information is judged to be correct, all or a part of the user information is registered with the network information storage section 124 by the communication control section 121 (or the authentication section 123) as connecting-user information. That is, all or a part of the user information judged to be correct becomes connecting-user information to be included in network information. To be more specific, for example, the user information includes an electronic certificate of the user, and the connecting-user information includes information about an issue-destination organization and division of the electronic certificate and information about an issue-source organization and division of the electronic certificate, among information recorded in the electronic certificate.

The network information storage section 124 stores the network information.

The network information transmission section 125 transmits the network information to the communication terminal 101 connected by the communication control section 121. The transmitted network information includes, for example, information about an access point (hereinafter referred to as access point information) and provided service information. The access point information includes, for example, the following information (A1) to (A7), that is, (A1) an access point name, (A2) all or a part of an electronic certificate of the access point 103, (A3) information indicating an encryption method, (A4) information indicating a number of viruses found in the communication network, (A5) information indicating a number of simultaneous connections to the communication network, (A6) information indicating a client authentication method and (A7) information indicating a network type. The information (A2) includes, for example, information about an operator and a certification authority. The information (A3) is information indicating an encryption method used for communication via the access point 103. The information (A5) is information indicating a number of other communication terminals currently connected to the access point 103. As the information (A7), there are, for example, "closed" indicating that the network is a closed network, "Internet" indicating that the network is connected to the Internet and the like. The provided service information is information received from other communication terminals 101A and registered with the network information storage section 124 (information including the above-mentioned information (P1) to (P4)).

An outline of a flow of processes performed in this embodiment will be described with reference to FIG. 3.

The network information notification section 117 in the above-mentioned other communication terminal 101A connected to the access point 103 and permitted to perform inter-AP communication notifies the provided service information to the access point 103 as network information (S1). The network information registration section 126 registers the network information with the network information storage section 124.

The communication terminal 101T receives, for example, an instruction to activate a certain communication AP 116T from a user. In this case, the communication control section 112 detects the instruction and starts inhibition of inter-AP communication (S2). In other words, communication of the communication AP 116T, the activation of which has been instructed, is disconnected (specifically, for example, in the case where the communication AP 116T is a Web browser, a message indicating that connection to the network is unavailable is displayed by the Web browser). In this state, it is not possible to access to the other communication APs 116A from the communication AP 116T nor access to the communication AP 116T from the other communication APs 116A.

The communication control section 112 receives input of connection information about the access point 103 from the user and transmits the connection information to the access point 103. Thereby, the communication terminal 101T is connected to the access point 103 (S3).

Next, for example, the user information receiving section 122 in the access point 103 requests user information from the connected communication terminal 101T. The user information transmission section 113 in the communication terminal 101T transmits the user information to the access point 103 in response to the request (S4). The user information receiving section 122 in the access point 103 receives the user information from the communication terminal 101T.

The authentication section 123 judges whether the received user information is correct or not. If a judgment result that the user information is correct is obtained, the communication control section 121 (or the authentication section 123) registers a part or all of the user information with the network information storage section 124 as connecting-user information.

If the judgment result that the user information is correct is obtained (that is, if user authentication has succeeded), the communication terminal 101T acquires network information from the access point 103 (S5). To be more specific, for example, the network information receiving section 114 of the communication terminal 101T requests network information from the access point 103, and the network information transmission section 125 in the access point 103 transmits the network information stored in the network information storage section 124 (or network information processed on the basis of the information) to the communication terminal 101T. The processed network information is, for example, in terms of connecting-user information, information including the number of users connecting to the access point 103, which has been identified from stored connecting-user information.

The network information receiving section 114 in the communication terminal 101T receives the network information. The judgment result acquisition section 115 acquires a judgment result about whether or not to permit inter-AP communication, which is based on the received network information (S6). For example, the judgment result acquisition section 115 displays a network connection approval screen as illustrated in FIG. 4 on the output device 204 (see FIG. 2A). The network connection approval screen is, for example, a GUI (Graphical User Interface) with a tool for displaying network information and accepting an instruction on whether the network connection is to be approved or not from the user. The user may judge how dangerous it is to connect to the access point 103, from the information of access point and connecting-user. The user may also judge whether or not it is worth connecting to the access point 103 from the provided service information (for example, if there is not a service he desires, he may judge that it is not worth connecting).

The judgment result acquisition section 115 accepts an instruction on whether the network connection is to be approved or not, from the user via the screen. If an instruction that the network connection is to be approved is accepted, it means that a judgment result that the inter-AP communication is to be permitted is acquired. On the other hand, if an instruction that the network connection is not to be approved is accepted, it means that a judgment result that the inter-AP communication is to be refused is acquired. The judgment result acquisition section 115 notifies the acquired judgment result to the communication control section 112 (S7).

If the notified judgment result indicates that the inter-AP communication is to be refused, the communication control section 112 disconnects the communication terminal 101T from the access point 103 (S8A). To be more specific, for example, the communication control section 112 inquires of the user whether or not to perform disconnection, and disconnects the communication terminal 101T from the access point 103 if it receives a response that the disconnection is to be performed (the disconnection may be performed without inquiring of the user).

On the other hand, if the notified judgment result indicates that the inter-AP communication is to be permitted, the communication control section 112 ends (releases) inhibition of the inter-AP communication (S8B). Thereby, it becomes possible for the communication AP 116T specified to be activated, to perform the inter-AP communication via the communication section 111T.

The above is description of the outline of the flow of the processes performed in this embodiment. If the communication terminal 101T holds the provided service information about services it can provide, it may notify the provided service information to the access point 103 as service information after being connected to the access point 103 (or after a judgment result that the inter-AP communication is to be permitted is acquired).

Flows of the processes performed in this embodiment will be described below in more detail with reference to FIGS. 5 to 10.

FIG. 5 shows an entire configuration of the processes performed in this embodiment. According to this diagram, a process 501 shown in FIG. 6 is performed first, and after that, a process 502 shown in FIG. 7 is performed. The process 502 shown in FIG. 7 includes a process 503 shown in FIG. 8, and the process 503 includes a process 504 shown in FIG. 9 and a process 505 shown in FIG. 10. Reference symbols written in the blocks shown in FIG. 5 are the reference symbols of the blocks shown in FIG. 3.

FIG. 6 shows a flow of network information registration process 501.

The network information notification section 117 in the above-mentioned other communication terminal 101A transmits the provided service information to the access point 103 as network information (S601). The network information registration section 126 in the access point 103 registers the network information with the network information storage section 124 (S602). The network information registration section 126 notifies a registration result (for example, that registration has been completed) to that other communication terminal 101A (S603).

FIG. 7 shows a flow of wireless communication setup process 502.

Figure 10:
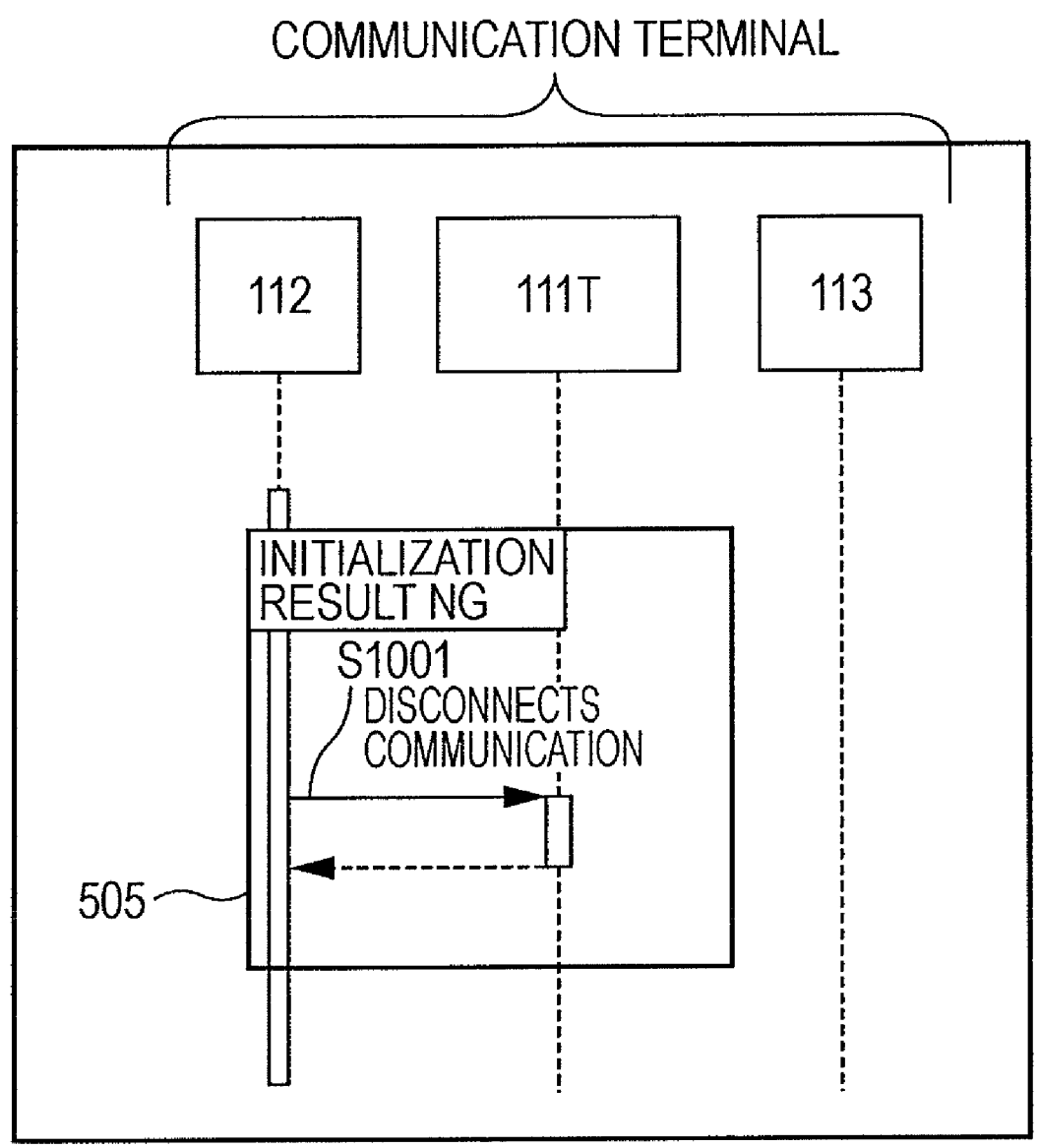
FIG. 10 shows a flow of initialization result NG process according to an embodiment of the invention.

When the communication terminal 101T receives an instruction to start wireless communication from the user (S701), the communication control section 112 inhibits communication of the communication APs 116T (S702). After that, the process 503 is performed, and the communication control section 112 notifies wireless communication state information to the user via the output device 204 (S703). As the notified wireless communication state information, there is, for example, information indicating: (T1) the inter-AP communication has been enabled or (T2) the inter-AP communication has been disconnected. The information (T1) is notified when S910 in FIG. 9 is performed, and the information (T2) is notified when an authentication result at S807 in FIG. 8 indicates failure in user authentication or when S911 in FIG. 9 or S1001 in FIG. 10 is performed.

FIG. 8 shows a flow of communication initialization process 503.

The communication control section 112 in the communication terminal 101T requests communication initialization from the access point 103 (S801). To be more specific, for example, the communication control section 112 connects to the access point 103 using connection information about the access point 103.

After the connection, the communication control section 121 in the access point 103 requests acquisition of user information from the user information receiving section 122 (S802). The user information receiving section 122 requests the acquisition of user information from the communication terminal 101T in response to the request (S803). The user information transmission section 113 in the communication terminal 101T transmits the user information to the access point 103 in response to the request (S804). The user information receiving section 122 receives the user information and hands it over to the communication control section 121 (S805).

When the communication control section 121 requests user authentication about whether the handed-over user information is correct or not from the authentication section 123 (S806), the authentication section 123 performs the user authentication about whether the user information is correct or not in response to the request, and notifies an authentication result to the communication control section 121 (S807). If the authentication result indicates failure in the user authentication, connection with the communication terminal 101T is cut by the communication control section 121. In this case, an initialization result notified at S809 indicates "NG" (disconnection due to failure in user authentication).

If the user authentication has succeeded, the communication control section 121 registers all or a part of the user information with the network information storage section 124 (S808). For example, after receiving a signal meaning that the registration has been completed from the network information storage section 124, the communication control section 121 returns a result of the communication initialization request at S801 to the communication terminal 101T (S809). If the communication initialization result indicates "OK", the process 504 shown in FIG. 9 is performed. If the communication initialization result indicates "NG", the process 505 shown in FIG. 10 is performed.

FIG. 9 shows a flow of initialization result OK process 504.

The communication control section 112 in the communication terminal 101T requests OK/NG judgment from the judgment result acquisition section 115 (S901). The judgment result acquisition section 115 requests acquisition of network information from the network information receiving section 114 in response to the request (S902). The network information receiving section 114 requests the network information from the access point 103 in response to the request (S903).

The network information transmission section 125 in the access point 103 requests the network information from the network information storage section 124 in response to the request (S904), and the network information storage section 124 provides stored network information to the network information transmission section 125 (S905). That is, the network information transmission section 125 reads the network information from the network information storage section 124. The network information transmission section 125 transmits the network information to the communication terminal 101T (S906).

The network information receiving section 114 in the communication terminal 101T receives the network information from the access point 103 and hands over the network information to the judgment result acquisition section 115 (S907).

The judgment result acquisition section 115 acquires an OK/NG judgment result based on the received network information (S908) and notifies the result to the communication control section 112 (S909).

Figure 11:
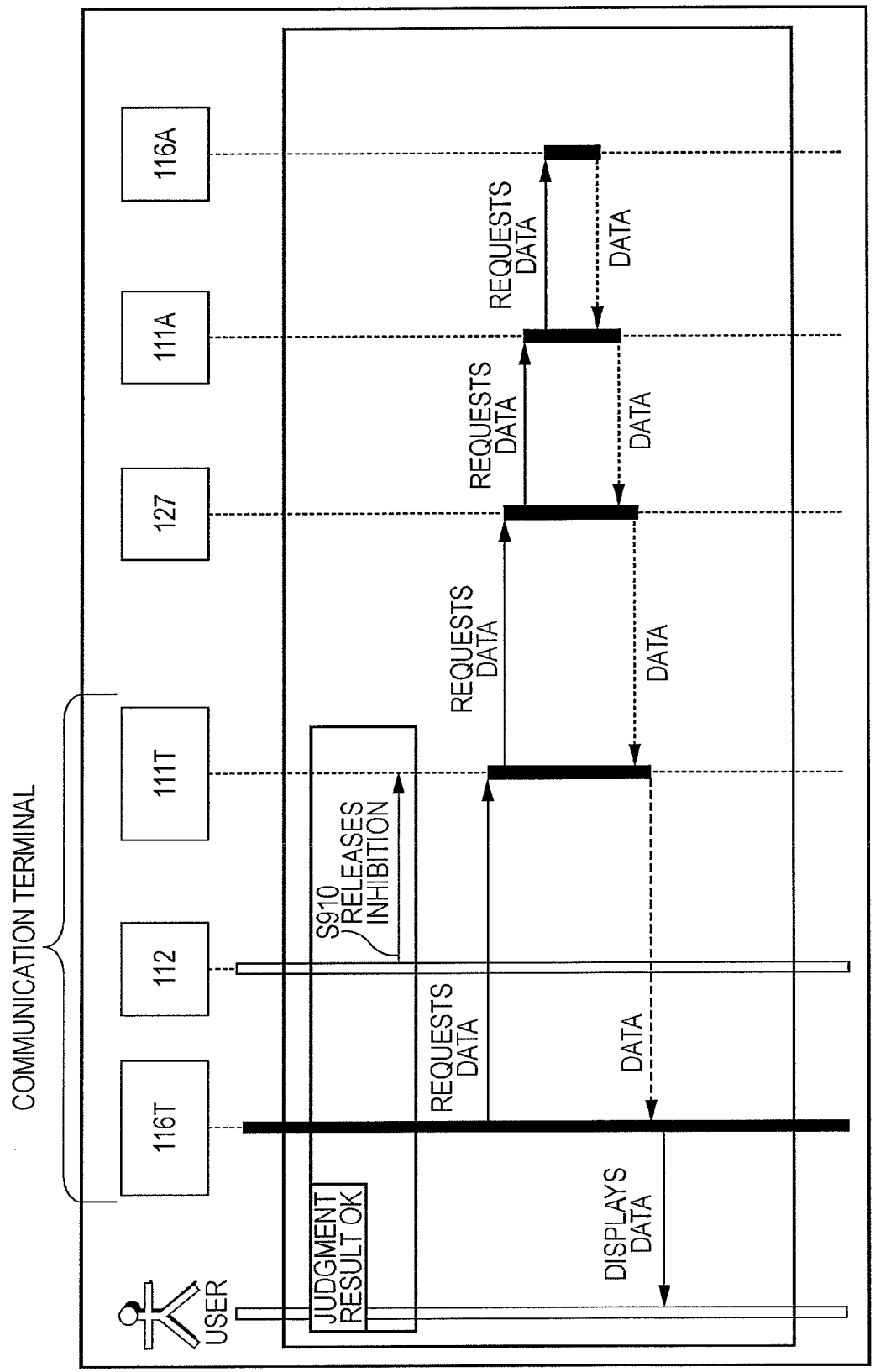
FIG. 11 shows a flow of a process performed in the case where a data request is transmitted from a communication AP after inter-AP communication is permitted in an embodiment of the invention.

If the judgment result is "OK", the communication control section 112 releases inhibition of inter-AP communication (S910). Thereby, the inter-AP communication is enabled. For example, as shown in FIG. 11, when a communication AP 116T issues a data request to one of the other communication APs 116A, the data request is sent to the access point 103 via the communication control section 112 and the communication section 111T, and it arrives at that other communication AP 116A in the above-mentioned other communication terminal 101A via the communication relay section 127 in the access point 103. Then, when that other AP 116A provides data in accordance with the data request, the data arrives at the communication AP 116T via the communication relay section 127 in the access point 103 and via the communication section 111T and the communication control section 112 in the communication terminal 101T. The communication AP 116T is able to display the received data on the output device 204.

Figure 12:
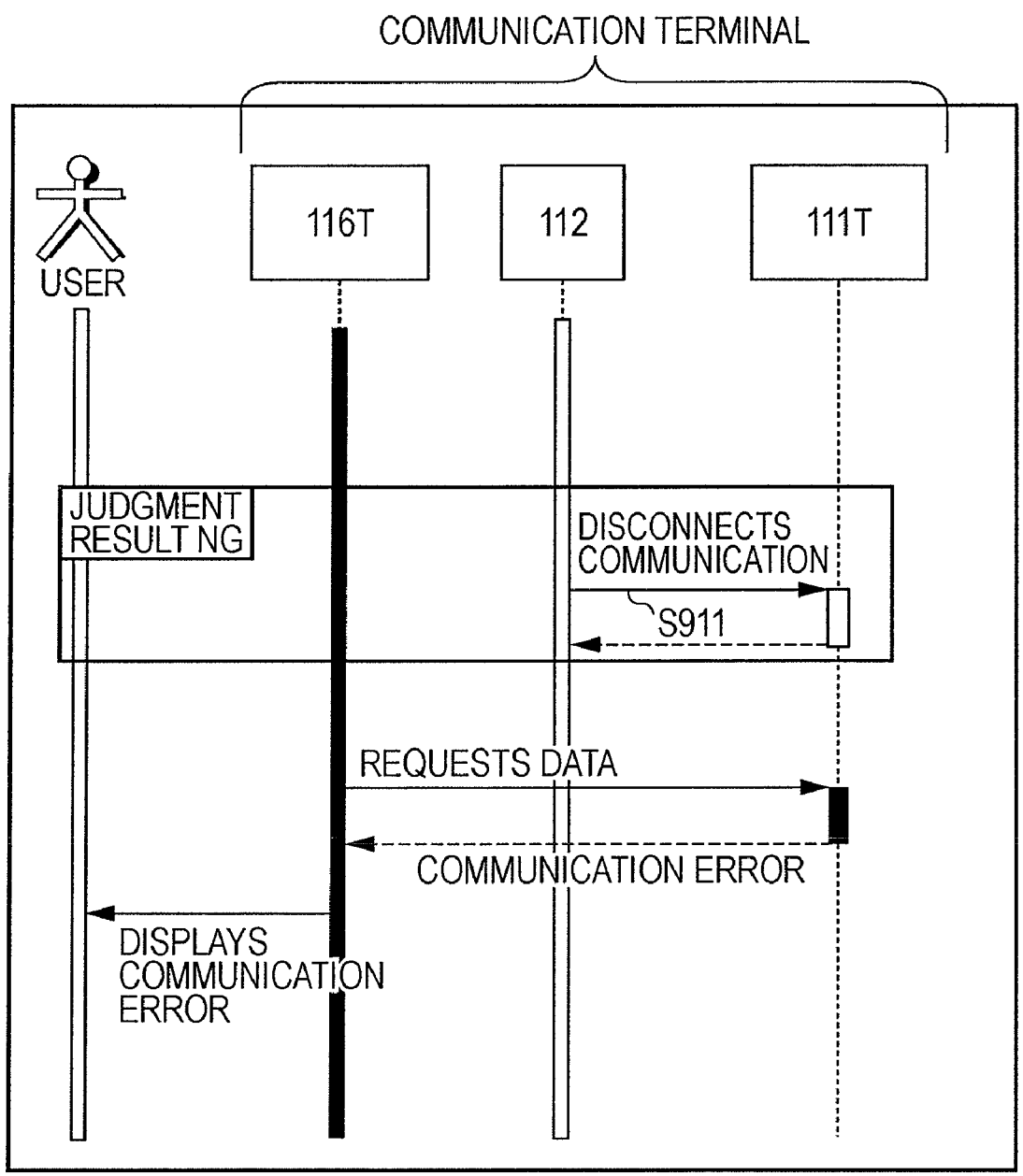
FIG. 12 shows a flow of a process performed in the case where a data request is transmitted from a communication AP after connection is cut in an embodiment of the invention.

On the other hand, if the judgment result is "NG", the communication control section 112 cuts connection with the access point 103 (S911). To be more specific, for example, the communication control section 112 requests disconnection from the communication section 111T, and the communication section 111T cuts connection with the access point 103 in response to the request. For example, as shown in FIG. 12, even if the communication AP 116T issues a data request to one of the other communication APs 116A after the disconnection, the data request is not able to go out of the communication section 111T because connection with the access point 103 is cut, and the communication AP 116T receives a communication error from the communication section 111T. The communication AP 116T is able to notify the communication error to the user.

FIG. 10 shows a flow of initialization result NG process 505. In this process, the communication control section 112 cuts connection with the access point 103 (S1001). In this case also, for example, even if a data request is issued to one of the other communication APs 116A from the communication AP 116T, the process described with reference to FIG. 12 is performed.

The above is description of the embodiment. According to the embodiment described above, a judgment result about whether the inter-AP communication is to be permitted or not, which is based on the network information, is acquired before a communication AP 116T performs the inter-AP communication, and connection with the access point 103 is cut if a judgment result indicating refusal is acquired. To be more specific, when a user judges that risk is high on the basis of access point information and/or connecting-user information or judges that it is not worth connecting because a desired service is not provided, connection with the access point 103 is cut. Therefore, it is possible to reduce risks brought by the connection to a wireless LAN.

A preferred embodiment according to an aspect of the invention has been described above. However, note that the embodiment has been illustrated for explanation of the invention, and the scope of the invention is not limited to this embodiment. The invention may be practiced in other various embodiments.

For example, in the case where the judgment result at S909 in FIG. 9 is "NG", the inter-AP communication inhibition state may be maintained instead of disconnection.

Furthermore, for example, at S6 in FIG. 3 (S908 in FIG. 9), the judgment result acquisition section 115 may acquire a judgment result by performing a process (1) or (2) below, instead of inquiring of the user whether or not to approve the connection:

(1) performing OK/NG judgment on the basis of judgment reference information prepared in advance; and (2) requesting OK/NG judgment from a third-party body (for example, a remote server).

The judgment reference information may be, for example, judgment rule information which tells what network information leads to what judgment result, or information telling network evaluation results from users who have used the wireless LAN before. When the judgment rule information is used, for example, a process described below may be performed. That is, for example, in the case where connecting-user information in network information indicates two different users, one of whom is "XXX Company, Mr. YYY" and the other of whom is "AAA Company, Mr. BBB", and if the judgment rule information says, "connecting users should be users of XXX Company only", the judgment result acquisition section 115 identifies that the network information does not conform with the judgment rule information. In this case, the judgment result acquisition section 115 acquires a judgment result that the inter-AP communication is to be refused.

Furthermore, for example, in the case where the communication terminal 101T is connected to the access point 103 and inhibition of the inter-AP communication is released, the communication control section 112 may notify the access point 103 that the inter-AP communication is permitted. In this case, the access point 103 may notify some specific or all of the connecting other communication terminals 101A about a connecting user, i.e., the user of the communication terminal 101T. Each of the other communication terminals 101A may, in the case where a judgment result indicating refusal of the inter-AP communication is acquired on the basis of the notified connecting user information (for example, in the case where the user of that other communication terminal 101A instructs disconnection or in the case where the connecting user information is judged not to conform with the above-mentioned judgment reference information), cut connection between that other communication terminal 101A and the access point 103 if the user of that other communication terminal 101A approves the disconnection (or without obtaining the approval of the disconnection from the user of that other communication terminal 101A).

The entire disclosure of Japanese Patent Application No. 2009-033455, filed Feb. 17, 2009 is expressly incorporated by reference herein.

What is claimed is:

1. A network connection control system, comprising:
a relay device that relays communication in a communication network; and
a communication terminal that performs communication via the relay device; wherein
the relay device includes a network information transmission section that transmits network information, which is information about the communication network; and
the communication terminal includes
   a lower communication section that performs communication via the relay device;
   a network information receiving section that receives the network information via the lower communication section;
   a higher communication section that performs inter-higher-section communication via the lower communication section, with another higher communication section in another communication terminal;
   a judgment result acquisition section that acquires a judgment result based on the received network information, about whether or not to permit the inter-higher-section communication; and
   a communication control section that inhibits the inter-higher-section communication until the judgment result is acquired and indicates that the inter-higher-section communication is to be permitted.

2. The network connection control system according to claim 1, wherein
the communication network is a wireless LAN (Local Area Network);
the higher communication section is a communication application;
the inter-higher-section communication is inter-application communication;
the relay device is an access point;
the access point includes
   a user information receiving section that receives another-user information about another user who is a user of another communication terminal, from that another communication terminal;
   a user authentication section that judges whether the another-user information is correct or not;
   a service information receiving section that receives service information, which is information about services provided by another communication terminal, from that another communication terminal; and
   a network information storage section that stores the network information;
the another-user information includes an electronic certificate of that another user;
the access point information includes an electronic certificate of the access point and network type information indicating the type of the communication network;
the network information includes at least a part of the electronic certificate in the another-user information judged to be correct, at least a part of the electronic certificate of the access point and the network type information;
the communication terminal includes a user information transmission section that transmits user information about a user of the communication terminal to the access point;
the communication control section starts inhibition of the inter-application communication when receiving a connection instruction from the user and, after that, connects to the access point using connection information for connecting to the access point;
the user information is transmitted to the access point, and the network information from the network information transmission section is received if the user information is judged to be correct by the user authentication section of the access point; and
the communication control section ends inhibition of the inter-application communication if the judgment result is acquired and indicates that the inter-application communication is to be permitted based on the network information, and, on the other hand, the communication control section cuts connection between the communication terminal and the access point if the judgment result is acquired and indicates that the inter-application communication is to be refused based on the network information.

3. The network connection control system according to claim 1, wherein the communication control section starts inhibition of the inter-higher-section communication when receiving a connection instruction.

4. The network connection control system according to claim 1, wherein the communication control section cuts connection between the communication terminal and the relay device if the judgment result is acquired and indicates that inter-higher-section communication is to be refused.

5. The network connection control system according to claim 1, wherein
the judgment result acquisition section performs a process (A) or (B) below:
(A) displaying the received network information on a user interface and receiving an instruction on whether or not to make an approval from a user; and
(B) judging whether or not to permit the inter-higher-section communication on the basis of judgment reference information prepared in advance and the received network information; and
in the case where the process (A) above is performed, that the judgment result is acquired and indicates that the inter-higher-section communication is to be permitted means that an instruction of approval is received from the user.

6. A network connection control method, wherein
a communication terminal not connected to a relay device that relays communication in a communication network, and having a higher communication section that performs inter-higher-section communication with another higher communication section in another communication terminal via a lower communication section, receives a connection instruction from a user of the communication terminal;
the communication terminal starts inhibition of the inter-higher-section communication when receiving the connection instruction;

the communication terminal connects to the relay device using connection information for connecting to the relay device and receives network information, which is information about the communication network, from the relay device;

the communication terminal acquires a judgment result based on the received network information, about whether or not to permit the inter-higher-section communication; and the communication terminal ends inhibition of the inter-higher-section communication if the judgment result is acquired and indicates that the inter-higher-section communication is to be permitted.

7. A communication terminal having a higher communication section that performs inter-higher-section communication with another higher communication section in another communication terminal via a lower communication section, the communication terminal comprising:

a network information receiving section that receives network information, which is information about the communication network, via the lower communication section;

a judgment result acquisition section that acquires a judgment result based on the received network information, about whether or not to permit the inter-higher-section communication; and a communication control section that inhibits the inter-higher-section communication until the judgment result is acquired and indicates that the inter-higher-section communication is to be permitted.

* * * * *